H. SHILLINGTON.
APPARATUS FOR FILTERING WATER, SEWAGE, AND THE LIKE.
APPLICATION FILED JULY 30, 1909.
988,391.
Patented Apr. 4, 1911.
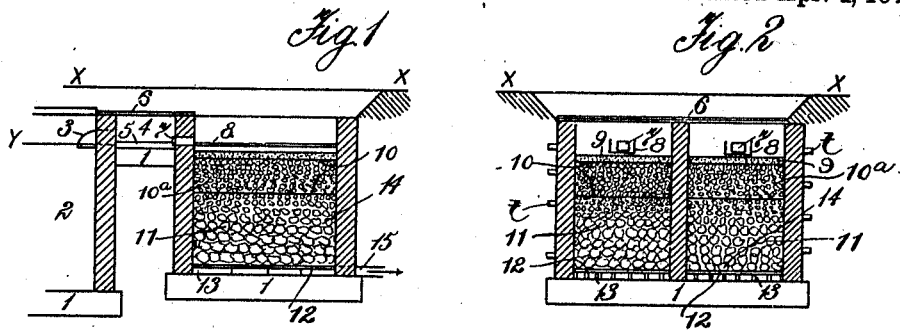
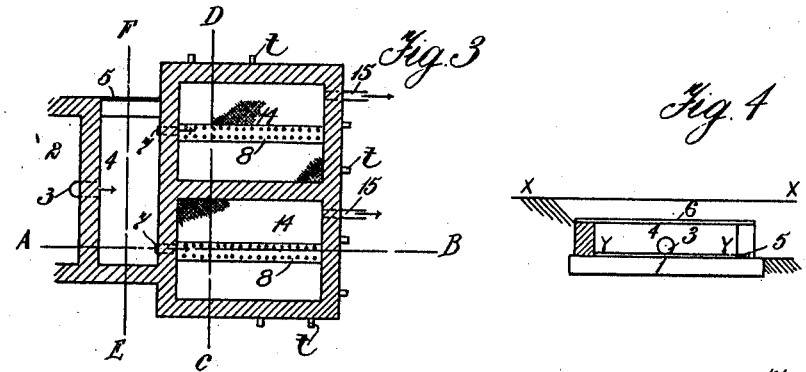
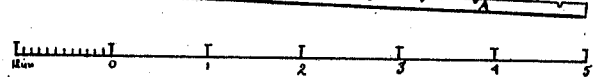
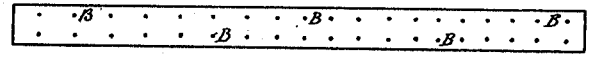
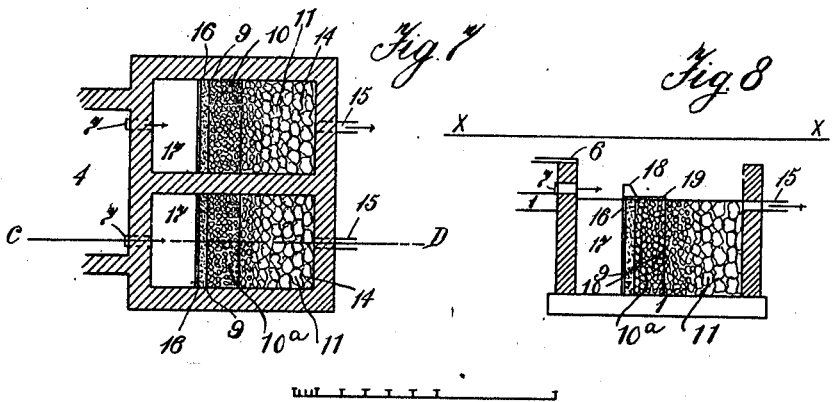
Witnesses
J. Mauritius
E. Smith.
Inventor.
Henry Shillington.
By Carl Tewes.
His Attorney.

UNITED STATES PATENT OFFICE.

HENRY SHILLINGTON, OF LURGAN, IRELAND.

APPARATUS FOR FILTERING WATER, SEWAGE, AND THE LIKE.

988,391. Specification of Letters Patent. Patented Apr. 4, 1911.

Application filed July 30, 1909. Serial No. 510,482.

*To all whom it may concern:*

Be it known that I, HENRY SHILLINGTON, a subject of the King of England, and resident of Lurgan, Ireland, have invented an Apparatus for Filtering Water, Sewage, and the Like, of which the following is a specification.

The object of the present invention is the production of an apparatus for the continuous filtration of firstly water, and secondly sewage which has been septically digested, so as to fit it for legal discharge into a river, or other running water.

In order that the invention may be more clearly understood, reference is made to the accompanying drawing wherein, Figure 1 is a vertical section through line A—B, Fig. 3; Fig. 2 a vertical section through line C—D, Fig. 3; Fig. 3 a plan of the filters; Fig. 4 shows a vertical section through line E—F, Fig. 3. Fig. 5 shows a side elevation of the distributing trough. Fig. 6 shows a plan of the distributing trough. Fig. 7 shows a plan of the filters of a second method of filtration. Fig. 8 shows a vertical section through line C—D in Fig. 7.

In putting my invention into practice I provide two filter chambers 14 to allow of the alternate use necessary for periodic cleansing and the like. The said filter chambers are of ordinary construction, founded on concrete beds 1 and the walls may be concrete, brick or stone, and preferably laid in cement mortar. I furthermore provide a septic tank 2 with a bend 3 and a receiving chamber 4 into which the sewage will flow by means of the said bend 3. A metal edged control weir 5 is arranged from the receiving chamber, in case the sewage from the dwelling should be so largely diluted in time of rainfall, as to overpower the filters. The receiving chamber moreover possesses a cover plate 6 to prevent the admission of dust and dirt. Penstocks 7 serve to control openings in the wall which divides the filter chambers from the receiving chamber, the sewage passing through these openings being received by distributing troughs 8, Figs. 2 and 3. The troughs consist of shallow metal or wooden trays, Figs. 5 and 6, having holes B in their lower part for the passage of water, while the sides are provided with nicks or notches A. The water passes from the penstocks 7 to the troughs 8 and trickles through the holes B to the sand layer without pitting the latter. The floor of each chamber, from the bottom of each of which runs an outfall pipe 15 with suitable inclination, is occupied by dry bricks 13, Figs 1 and 2, laid in rows about 4 inches apart and forming channels for conveying the effluent to the outlet pipe 15. The channels formed between the bricks are covered by tiles 12, laid one inch apart over the said channels. On this brick and tile floor are cinders, coke, coal or slate 11, in various sizes commencing with larger grades, and finishing on top with cinders $\frac{1}{8}$ inch to $\frac{1}{4}$ inch size in cube. The top of the last layer carries galvanized iron wire nettings 10,— finely meshed and fitting close to each other and to the sides of the chambers. On these nettings I arrange layers of polarite $10^a$, of suitable grading as to sizes, the top being truly leveled. On this polarite in turn are laid galvanized wire nettings 10 as before, and covered with 3 inches deep of coarse, sharp, river sand—or well washed pit sand 9, free of gravel,—or very fine cinders, free from dust. From various levels in each chamber, galvanized iron tubes *t* project out in such situations as are deemed desirable, and to a height of several inches over the top of the sand layer 9 and to promote ventilation of strata.

Contrary to the filters just described, which are for downward filtration, Figs. 7 and 8 illustrate an apparatus for lateral filtration. The inlet 7, from the receiving chamber 4 is the same as for the downward filters,—but a space 17 is left for the sewage to fill, and this is faced by galvanized wire netting 16 of stout framing, and stronger than those afore-described. The sand, or fine cinders 9, the polarite $10^a$ and the larger cinders or other material 11, follow in same order, as in the apparatus for downward filtration, the sand 9, polarite $10^a$, and the cinders, etc., 11, being separated by galvanized wire netting 10, same as before. In each chamber, on top of the sand and polarite layers a $\frac{1}{2}$ inch thick iron plate 19 is built into the chamber wall at each side, confining the material, and carrying low edge wall of concrete 18 to keep the fluid from overrunning the filter without passing through it. The outlets 15 from the chambers to be lower than the surface of the material in them.

In either apparatus for filtration, *i. e.* the downward or the lateral, as described,—the relative positions and thickness of the different media—also the number of the netting layers, may be altered, as the constitution of the fluid to be filtered, may be found to require.

The septic tank can be of any desired size and is preferably of greater depth than the filter chambers, while the receiving chamber 4 is shallow; the floors of the receiving chamber being only a short distance below the level of the bends 3 and the penstocks 7.

X—X denotes the ground level and Y—Y denotes the level of the liquid in the septic tank.

The successful filtration of water will be effected by the application of the same principles, and the use of materials and means similar to those described for the filtration of sewage; the points of difference being only those of detail, e. g. form and arrangement of distributing channels or troughs,—thicknesses of media, etc.

Having fully described my invention, what I claim and desire to secure by Letters Patent is:—

An apparatus for filtering water, sewage and the like comprising in combination a plurality of filter chambers, a receiving chamber connecting therewith, a septic tank connecting with the latter, outfall-pipes leading from said chambers, bricks laid on the floors of said filter chambers and forming channels, tiles covering the said channels, filtering media, which is laid on the floors formed by said bricks and tiles, a plurality of galvanized wire nettings fitting close to the sides of said chambers, layers of polarite spread on said nettings, galvanized iron tubes leading from various levels in said chambers, and a metal edged control weir arranged over the receiving chambers in case the sewage should be so largely diluted as to overpower the filters, substantially as described and shown and for the purpose set forth.

In testimony whereof I have hereunto set my hand in the presence of two subscribing witnesses.

HENRY SHILLINGTON.

Witnesses:
C. C. GREENFIELD,
F. C. McCANN.

---

Copies of this patent may be obtained for five cents each, by addressing the "Commissioner of Patents, Washington, D. C."